United States Patent
Cho et al.

(10) Patent No.: US 11,794,810 B2
(45) Date of Patent: Oct. 24, 2023

(54) APPARATUS AND METHOD FOR ESTIMATING STEERING ANGLE OF VEHICLE

(71) Applicants: HYUNDAI MOTOR COMPANY, Seoul (KR); KIA MOTORS CORPORATION, Seoul (KR)

(72) Inventors: Seung Bum Cho, Gwacheon-si (KR); Woo Je Sung, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 311 days.

(21) Appl. No.: 17/021,258

(22) Filed: Sep. 15, 2020

(65) Prior Publication Data

US 2021/0078632 A1   Mar. 18, 2021

(30) Foreign Application Priority Data

Sep. 18, 2019   (KR) .......................... 10-2019-0114832

(51) Int. Cl.
*B62D 15/02* (2006.01)
(52) U.S. Cl.
CPC .................................. *B62D 15/024* (2013.01)

(58) Field of Classification Search
CPC ........ B62D 15/024; B62D 15/02; B62D 1/00; B62D 15/021
See application file for complete search history.

(56) References Cited

U.S. PATENT DOCUMENTS

| | | | | |
|---|---|---|---|---|
| 5,435,635 | A | * 7/1995 | Watanabe | ............... B60T 8/176 701/79 |
| 2003/0212476 | A1 | * 11/2003 | Aanen | .................... B62D 15/02 702/92 |
| 2017/0088173 | A1 | 3/2017 | Kawabe et al. | |

FOREIGN PATENT DOCUMENTS

| JP | 2008-213709 A | 9/2008 |
|---|---|---|
| JP | 4345355 B2 | 10/2009 |
| JP | 2013-028244 A | 2/2013 |
| KR | 10-1048775 B1 | 7/2011 |
| KR | 10-1514132 B1 | 4/2015 |

\* cited by examiner

*Primary Examiner* — Rachid Bendidi
*Assistant Examiner* — Andrew J Cromer
(74) *Attorney, Agent, or Firm* — MORGAN, LEWIS & BOCKIUS LLP

(57) ABSTRACT

The present disclosure relates to an apparatus and a method for estimating a steering angle of a vehicle, and an object of the present disclosure is to provide an apparatus and a method for estimating a steering angle of a vehicle capable of estimating an actual steering angle without using a steering angle sensor.

12 Claims, 3 Drawing Sheets

APPARATUS AND METHOD FOR ESTIMATING STEERING ANGLE OF VEHICLE

CROSS-REFERENCE TO RELATED APPLICATION

The present application claims the benefit of priority to Korean Patent Application No. 10-2019-0114832, filed on Sep. 18, 2019 in the Korean Intellectual Property Office (KIPO), the entire disclosure of which is incorporated herein by reference.

TECHNICAL FIELD

The present disclosure relates to an apparatus and a method for estimating a steering angle of a vehicle, and more particularly, to an apparatus and a method for estimating a steering angle of a vehicle, which can estimate a real-time steering angle of a steering wheel without using a steering angle sensor.

BACKGROUND

A motorized steering device of a vehicle generates a motor torque for assisting a driver's steering force when a driver steers a steering wheel, and it is also called a motor driven power steering (MDPS) device.

In general, a motorized steering device uses a steering angle sensor for measuring a steering angle of a steering wheel for an effective steering control, and other devices (e.g., ESC, ADAS, and the like) in a vehicle use a signal of the steering angle sensor to improve the driving performance.

If the steering angle sensor is out of order, it is not possible to apply the signal of the steering angle sensor to the steering control, and thus it is difficult to ensure stable cornering. Recently, in the case of a vehicle that requires cost reduction, the steering angle sensor may not be applied.

Accordingly, there is a need for schemes to cope with trouble of the steering angle sensor of the motorized steering device.

The above information disclosed in this background section is to aid in the understanding of the background of the disclosure, and should not be taken as acknowledgement that this information forms any part of prior art.

SUMMARY OF THE DISCLOSURE

The present disclosure is proposed for solving the above problems, and the object of the present disclosure is to provide an apparatus and a method for estimating a steering angle of a vehicle, which can estimate a real-time steering angle without using a steering angle sensor during cornering.

In one aspect of the present disclosure, an apparatus for estimating a steering angle of a vehicle includes a wheel speed difference calculator configured to determine an actual speed difference by calculating a difference between a rotating speed of a rear right wheel and a rotating speed of a rear left wheel during cornering; a wheel speed difference estimator configured to determine a predicted speed difference by estimating the difference between the rotating speed of the rear right wheel and the rotating speed of the rear left wheel based on at least one of a driving current of an electric motor assisting a rotation of a steering wheel during steering or an assist torque; a feedback controller configured to determine a correction factor for removing an error between the actual speed difference and the predicted speed difference if the error exists; a predicted speed difference compensator configured to determine a renewal predicted speed difference by compensating for the predicted speed difference based on the correction factor; and a steering angle estimator configured to determine a predicted steering angle by calculating a steering angle of the steering wheel based on the correction factor if it is determined that the error does not exist between the actual speed difference and the renewal predicted speed difference.

Specifically, the predicted speed difference compensator may include a compensated speed difference estimator configured to determine a compensated speed difference for compensating for the error between the actual speed difference and the predicted speed difference based on the correction factor; and an error compensator configured to calculate the renewal predicted speed difference by summing up the predicted speed difference and the compensated speed difference. The correction factor may be a predicted steering angular velocity that is determined based on at least one of the driving current or the assist torque, the actual speed difference, and the predicted speed difference.

Further, the feedback controller may determine that the error exists between the actual speed difference and the predicted speed difference if the difference between the actual speed difference and the predicted speed difference is equal to or larger than a determined reference error. The feedback controller may re-determine the correction factor for compensating for and removing the error if it is determined that the error exists between the actual speed difference and the renewal predicted speed difference.

In another aspect of the present disclosure, a method for estimating a steering angle of a vehicle includes determining an actual speed difference by calculating a difference between a rotating speed of a rear right wheel and a rotating speed of a rear left wheel during cornering; determining a predicted speed difference by estimating the difference between the rotating speed of the rear right wheel and the rotating speed of the rear left wheel based on at least one of a driving current of an electric motor assisting a rotation of a steering wheel during steering or an assist torque; determining a correction factor for removing an error between the actual speed difference and the predicted speed difference if the error exists; determining a renewal predicted speed difference by compensating for the predicted speed difference based on the correction factor; and determining a predicted steering angle by calculating a steering angle of the steering wheel based on the correction factor if it is determined that the error does not exist between the actual speed difference and the renewal predicted speed difference.

According an exemplary embodiment of the present disclosure, a steering angle of a steering wheel of a vehicle can be accurately estimated using sensing values (e.g., a rotating speed value of arear left/right wheel, a driving current value of an electronic motor for assisting a rotation of the steering wheel, and an assist torque value) that can be detected in real time in the vehicle during a cornering.

According to an exemplary embodiment of the present disclosure, a stable cornering can be ensured even if a steering angle sensor is out of order. Further, according to an exemplary embodiment of the present disclosure, in the case of the vehicle requiring cost reduction, it is possible to delete the steering angle sensor, and deterioration of the driving performance due to the deletion of the steering angle sensor can be prevented from occurring.

Other aspects and preferred embodiments of the disclosure are discussed infra.

It is understood that the term "vehicle" or "vehicular" or other similar term as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

Figure 1:
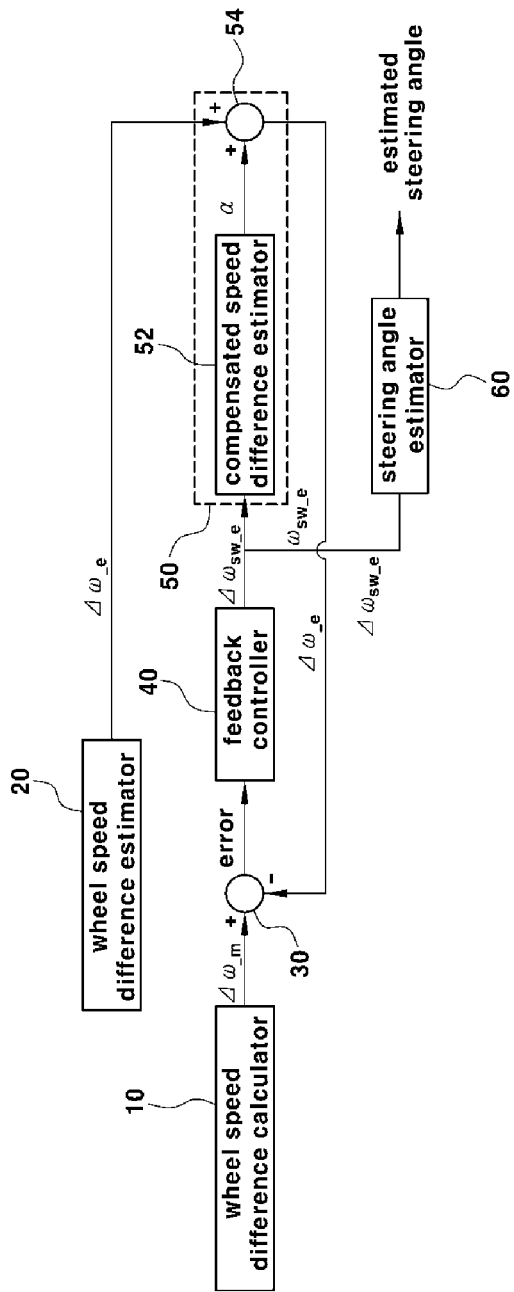
FIG. 1 is a diagram illustrating the configuration of an apparatus for estimating a steering angle of a vehicle according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

In the whole description, it will be understood that when a component is referred to as being "comprising" any component, it does not exclude other components, but can further comprises the other components unless otherwise specified.

In general, a controller for a motorized steering device of a vehicle determines a driver's steering force (or referred to as "driver's torque") for steering a steering wheel and an assist torque of an electric motor for assisting the driver's torque in accordance with a real-time vehicle speed.

When a driver steers the steering wheel, the electric motor is provided with a driving current that is determined by the controller to assist the driver's torque, and as cornering of the vehicle is performed, a difference between cornering radii of rear left/right wheels may occur. Further, due to the occurrence of the difference between the cornering radii, a difference between rotating speeds of the rear left/right wheels may also occur.

According to the present disclosure, a real-time steering angle of the steering wheel can be estimated using the speed difference between the rear left/right wheels, the driving current of the electric motor, and/or the assist torque.

For this, as illustrated in FIG. 1, an apparatus for estimating a steering angle of a vehicle according to an exemplary embodiment of the present disclosure may include a wheel speed difference calculator 10, a wheel speed difference estimator 20, a wheel speed difference comparator 30, a feedback controller 40, a predicted speed difference compensator 50, and a steering angle estimator 60.

According to an exemplary embodiment of the present disclosure, the wheel speed difference calculator 10, the wheel speed difference estimator 20, the wheel speed difference comparator 30, the feedback controller 40, the predicted speed difference compensator 50, and the steering angle estimator 60 of the apparatus each may be a processor (e.g., computer, microprocessor, CPU, ASIC, circuitry, logic circuits, etc.). Each of the components 10, 20, 30, 40, 50, and 60 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. According to some aspect of the present disclosure, the components 10, 20, 30, 40, 50, and 60 may embody one or more processor(s) each having associated non-transitory memory.

The vehicle may be a vehicle that performs cornering through front left/right wheels. That is, the vehicle performs cornering as the front left/right wheels are rotated left and right with respect to a vehicle driving direction. During the cornering, a difference between cornering radii of the rear left/right wheels occurs, and due to the occurrence of the difference between the cornering radii, a difference between rotating speeds of the rear left/right wheels occurs. Accordingly, it is possible to estimate a steering angle corresponding to the rotating angle of the steering wheels using the speed difference between the rear left/right wheels.

The wheel speed difference calculator 10 of the apparatus may be configured to calculate an actual speed difference of the rear left/right wheels (i.e., speed difference calculation value of the rear left/right wheels) $\Delta\omega_m$. The wheel speed difference calculator 10 calculates a speed difference between the rotating speed (first speed) of the rear right wheel and the rotating speed (second speed) of the rear left wheel as the actual speed difference value $\Delta\omega_m$. The first speed and the second speed are actually measured speed values, and speed values detected by wheel tachometers installed in the vehicle may be used. The wheel tachometer may be a wheel tachometer that is built in an anti-lock brake system (ABS) of the vehicle. Further, the wheel speed difference calculator 10 may be provided to be built in a controller of the ABS.

The wheel speed difference estimator 20 of the apparatus may be configured to estimate a predicted speed difference of the rear left/right wheels (i.e., speed difference predicted value of the rear left/right wheels) $\Delta\omega_e$. The predicted speed difference $\Delta\omega_e$ is predicted as a rotating speed difference value between the rear right wheel and the rear left wheel. The wheel speed difference estimator 20 estimates the speed difference between the rear left/right wheels based on at least one of the driving current of the electric motor or the assist torque, and it determines the estimated speed difference value as a predicted speed difference value $\Delta\omega_e$. In other words, the wheel speed difference estimator 20 may be configured to estimate the predicted speed difference $\Delta\omega_e$ based on the driving current, to estimate the predicted speed difference $\Delta\omega_e$ based on the assist torque, or to estimate the predicted speed difference $\Delta\omega_e$ based on the driving current and the assist torque. For this, the wheel speed difference estimator 20 may be provided with a predicted speed difference determination map for determining the predicted speed difference $\Delta\omega_e$ based on at least one of the driving current or the assist torque.

Because the wheel speed difference estimator 20 estimates the predicted speed difference $\Delta\omega_e$ of the rear left/right wheels using at least one of the driving current or the assist torque, accuracy of the predicted speed difference can be increased. The electric motor is supplied with the driving current, and it outputs the assist torque for assisting a driver's steering force for rotating the steering wheels. Accordingly, the assist torque may be changed in accordance with the driving current, and the assist torque may exert an influence on the steering angle of the steering wheels. Accordingly, when the predicted speed difference $\Delta\omega_e$ is estimated, at least one of the driving current or the assist torque may be used to increase the accuracy of the predicted speed difference $\Delta\omega_e$.

As the driving current, a measured value detected using a current sensor of the motorized steering device mounted on the vehicle may be used. The assist torque may be determined based on the driver's steering torque and a real-time vehicle speed. Specifically, the assist torque may be estimated by a torque determination map that is constructed to determine the assist torque in accordance with the driver's steering torque and the real-time vehicle speed.

The wheel speed difference comparator 30 of the apparatus is configured to compare the actual speed difference $\Delta\omega_m$ and the predicted speed difference $\Delta\omega_e$ with each other, and to calculate a difference value between the actual speed difference $\Delta\omega_m$ and the predicted speed difference $\Delta\omega_e$. In other words, the wheel speed difference comparator 30 is configured to calculate an error between the actual speed difference $\Delta\omega_m$ and the predicted speed difference $\Delta\omega_e$.

The feedback controller 40 of the apparatus may be configured to determine a correction factor $\Delta\omega_{sw\_e}$ for removing the error depending on whether the error exists between the actual speed difference $\Delta\omega_m$ and the predicted speed difference $\Delta\omega_e$. If the error value between the actual speed difference $\Delta\omega_m$ and the predicted speed difference $\Delta\omega_e$ is equal to or larger than a configured reference error A, the feedback controller 40 determines that the error exists between the actual speed difference $\Delta\omega_m$ and the predicted speed difference $\Delta\omega_e$. That is, if the error between the actual speed difference $\Delta\omega_m$ and the predicted speed difference $\Delta\omega_e$ is equal to or larger than the configured reference error A, the feedback controller 40 estimates the correction factor $\Delta\omega_{sw\_e}$. The feedback controller 40 may receive an input of the actual speed difference value $\Delta\omega_m$ from the wheel speed difference calculator 10 and it may receive an input of the predicted speed difference value $\Delta\omega_e$ from the wheel speed difference estimator 20. The feedback controller 40 may receive an input of at least one of the driving current value of the electric motor or the assist torque value from the controller of the motorized steering device. The reference error A may be configured as a small value whereby it is assumed that the error does not exist between the actual speed difference $\Delta\omega_m$ and the predicted speed difference $\Delta\omega_e$.

The feedback controller 40 may estimate the correction factor $\Delta\omega_{sw\_e}$ based on the actual speed difference value $\Delta\omega_m$, the predicted speed difference value $\Delta\omega_e$, and the driving current value of the electric motor. It is also possible that the feedback controller 40 estimates the correction factor $\Delta\omega_{sw\_e}$ using the assist torque value of the electric motor instead of the driving current value. Further, it is also possible that the feedback controller 40 estimates the correction factor $\Delta\omega_{sw\_e}$ using both the driving current value and the assist torque value.

The feedback controller 40 may be provided with a correction factor determination map for determining the correction factor $\Delta\omega_{sw\_e}$ based on the actual speed difference value $\Delta\omega_m$, the predicted speed difference value $\Delta\omega_e$, and the driving current value. The feedback controller 40 may also be provided with a correction factor determination map for determining the correction factor $\Delta\omega_{sw\_e}$ using the assist torque value of the electric motor instead of the driving current value. Further, it is also possible that the feedback controller 40 is provided with a correction factor determination map for determining the correction factor $\Delta\omega_{sw\_e}$ using both the driving current value and the assist torque value.

The correction factor $\Delta\omega_{sw\_e}$ is a predicted steering angular velocity that is estimated based on at least one of the driving current value of the electric motor or the assist torque value, the actual speed difference $\Delta\omega_m$, and the predicted speed difference $\Delta\omega_e$.

The predicted speed difference compensator 50 of the apparatus determines a renewal predicted speed difference $\Delta\omega_e + \alpha$ by correcting the predicted speed difference We based on the correction factor $\Delta\omega_{sw\_e}$. For this, the predicted speed difference compensator 50 may include a compensated speed difference estimator 52 and an error compensator 54. The compensated speed difference estimator 52 is configured to estimate a compensated speed difference value $\alpha$ for compensating for the error between the actual speed difference $\Delta\omega_m$ and the predicted speed difference $\Delta\omega_e$ based on the correction factor $\Delta\omega_{sw\_e}$. For this, the compensated speed difference estimator 52 may be provided with a compensated speed difference determination map for determining the compensated speed difference value a based on the correction factor $\Delta\omega_{sw\_e}$. The error compensator 54 calculates the renewal predicted speed difference $\Delta\omega_e + \alpha$ as a value obtained by summing up the predicted speed difference $\Delta\omega_e$ and the compensated speed difference $\alpha$. For this, the error compensator 54 may be provided with a summer for summing up the predicted speed difference $\Delta\omega_e$ predicted by the wheel speed difference estimator 20 and the compensated speed difference $\alpha$ estimated by the compensated speed difference estimator 52.

Further, the steering angle estimator 60 of the apparatus is configured to estimate the steering angle of the steering wheel based on the correction factor $\Delta\omega_{sw\_e}$ that is output and transmitted from the feedback controller 40. If it is determined that the error does not exist between the actual speed difference $\Delta\omega_m$ and the renewal predicted speed difference $\Delta\omega_e+\alpha$, the steering angle estimator 60 may estimate the predicted steering angle using the correction factor $\Delta\omega_{sw\_e}$ used to determine the renewal predicted speed difference $\Delta\omega_e+\alpha$. The correction factor $\Delta\omega_{sw\_e}$ is the predicted steering angular velocity value, and thus the steering angle estimator 60 may calculate the predicted steering angle of the steering wheel by integrating the correction factor $\Delta\omega_{sw\_e}$. That is, the predicted steering angle may be calculated as a value obtained by integrating the predicted steering angular velocity $\Delta\omega_{sw\_e}$. For this, the steering angle estimator 60 may be provided with an integrator that can calculate the predicted steering angle by integrating the correction factor $\Delta\omega_{sw\_e}$.

According to one exemplary embodiment of the present disclosure, the predicted steering angle of the steering wheel, as calculated above, may be used for performing a cornering control of a vehicle.

On the other hand, if it is determined that the difference (i.e., error) exists between the actual speed difference $\Delta\omega_m$ and the renewal predicted speed difference $\Delta\omega_e+\alpha$, the feedback controller 40 may repeatedly estimate the renewal predicted speed difference until it is determined that the error has been removed. For this, if the error exists between the actual speed difference $\Delta\omega_m$ and the renewal predicted speed difference $\Delta\omega_e+\alpha$, the wheel speed difference comparator 30 outputs the error value to the side of the feedback controller 40, and if the error value is input, the feedback controller 40 may estimate and determine a new correction factor in accordance with the result of comparison with the reference error A.

If the error between the actual speed difference $\Delta\omega_m$ and the renewal predicted speed difference $\Delta\omega_e+\alpha$ is smaller than the reference error A, the feedback controller 40 determines that the error has been removed, whereas if the error is equal to or larger than the reference error A, the feedback controller 40 determines that the error has not been removed. If the error between the actual speed difference $\Delta\omega_m$ and the renewal predicted speed difference $\Delta\omega_e+\alpha$ is smaller than the reference error A, the feedback controller 40 outputs the correction factor $\Delta\omega_{sw\_e}$ that is applied when the renewal predicted speed difference $\Delta\omega_e+\alpha$ is calculated to the steering angle estimator 60, whereas if the error is equal to or larger than the reference error A, the feedback controller 40 outputs and transfers a new correction factor that is calculated based on the error to the compensated speed difference estimator 52. The feedback controller 40 may repeatedly estimate the correction factor until the error becomes smaller than the reference error A. The feedback controller 40 may estimate the new correction factor through reception of the actual speed difference $\Delta\omega_m$ and the renewal predicted speed difference $\Delta\omega_e+\alpha$ whenever it re-estimates the new correction factor.

A process of estimating a predicted steering angle of a steering wheel using the apparatus for estimating the steering angle as configured above according to an exemplary embodiment of the present disclosure will be described hereinafter.

Figure 2:
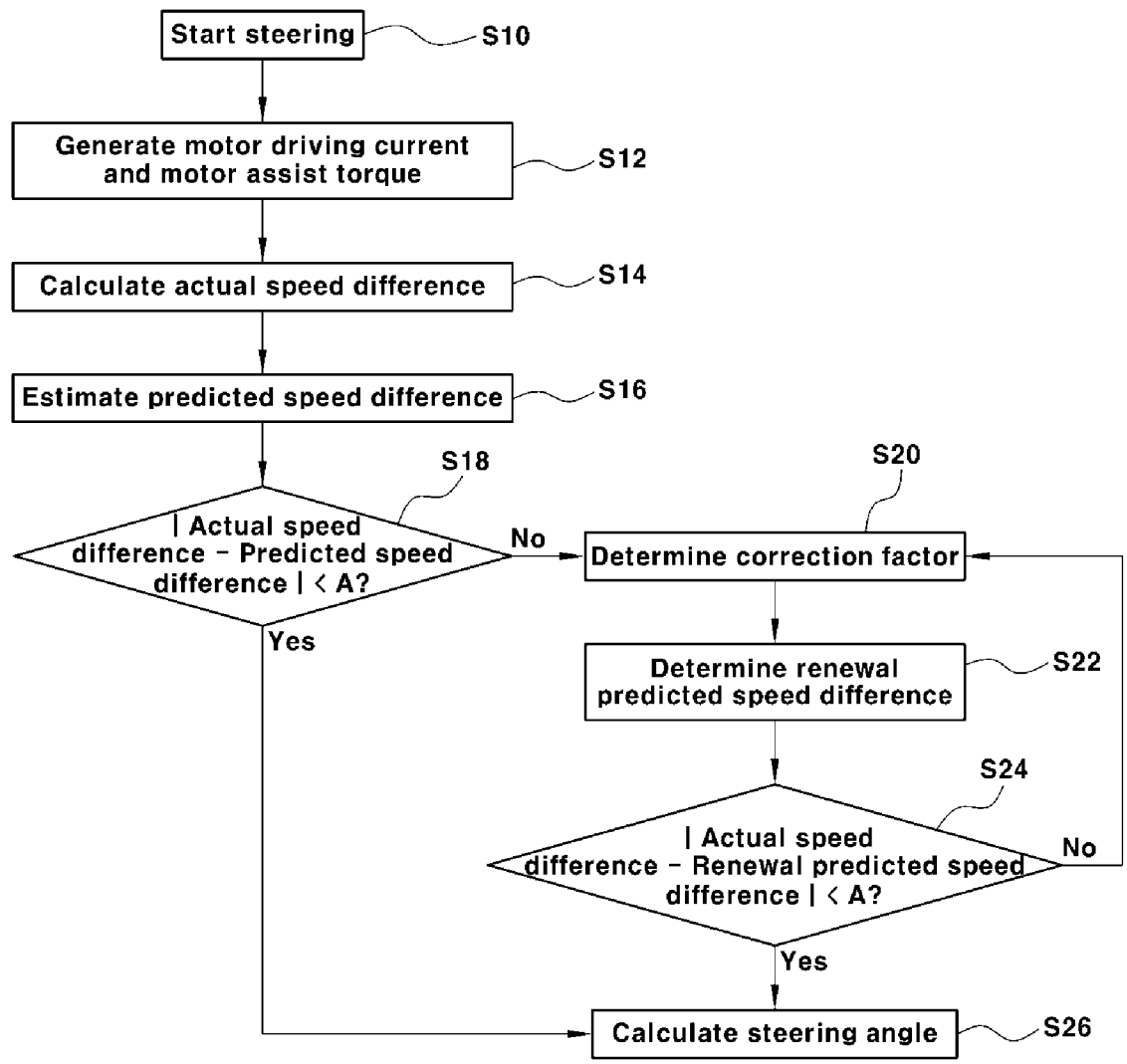
FIG. 2 is a flowchart illustrating a method for estimating a steering angle of a vehicle according to an exemplary embodiment of the present disclosure.

As illustrated in FIG. 2, if the driver performs steering by rotating the steering wheel (S10), the driving current is supplied to the electric motor for assisting the rotation of the steering wheel (S12). If the driving current is applied, the electric motor generates the assist torque, and the steering wheel is rotated by the driver's steering torque and the assist torque, resulting in that the vehicle performs the cornering.

The driving current value may be detected by the current sensor, and it may be input to the wheel speed difference estimator 20.

During the cornering, the speed difference occurs between the rear left/right wheels, and the rotating speed value of the rear right wheel and the rotating speed value of the rear left wheel, which are detected by the wheel tachometers installed in the vehicle, are input to the wheel speed difference calculator 10. The wheel speed difference calculator 10 calculates the difference value between the rotating speed value of the rear right wheel and the rotating speed value of the rear left wheel, and it determines the difference value as the actual speed difference value $\Delta\omega_m$ (S14).

Further, the wheel speed difference estimator 20 estimates the speed difference between the rear left/right wheels based on the driving current value, and it determines the estimated speed difference value as the predicted speed difference value $\Delta\omega_e$ (S16).

Next, the wheel speed difference comparator 30 receives the actual speed difference $\Delta\omega_m$ and the predicted speed difference $\Delta\omega_e$, calculates the difference value between the actual speed difference $\Delta\omega_m$ and the predicted speed difference $\Delta\omega_e$, and compares the difference value with the configured reference error A (S18).

If it is determined that the error between the actual speed difference $\Delta\omega_m$ and the predicted speed difference $\Delta\omega_e$ is equal to or larger than the reference error A, the feedback controller 40 estimates and determines the correction factor $\Delta\omega_{sw\_e}$ for compensating for the error (S20).

Next, if the correction factor $\Delta\omega_{sw\_e}$ is input, the predicted speed difference compensator 50 calculates and determines the renewal predicted speed difference $\Delta\omega_e+\alpha$ as a value obtained by compensating for the predicted speed difference $\Delta\omega_e$ (S22). The renewal predicted speed difference $\Delta\omega_e+\alpha$ is calculated as a value obtained by summing up the predicted speed difference $\Delta\omega_e$ and the compensated speed difference $\alpha$. The compensated speed difference $\alpha$ is determined as a value for compensating for the error of the predicted speed difference $\Delta\omega_e$ with respect to the actual speed difference $\Delta\omega_m$, and it is calculated based on the correction factor $\Delta\omega_{sw\_e}$.

Then, the error between the actual speed difference $\Delta\omega_m$ and the renewal predicted speed difference $\Delta\omega_e+\alpha$ is compared with the reference error A (S24). If the error between the actual speed difference $\Delta\omega_m$ and the renewal predicted speed difference $\Delta\omega_e+\alpha$ is smaller than the reference error A, it is determined that the error does not exist, and the steering angle value of the steering wheel is estimated based on the correction factor $\Delta\omega_{sw\_e}$ that is used when the renewal predicted speed difference $\Delta\omega_e+\alpha$ is determined, and the estimated steering angle is determined as the predicted steering angle (S26).

The correction factor $\Delta\omega_{sw\_e}$ is the predicted steering angular velocity value that is estimated based on the actual speed difference $\Delta\omega_m$, the predicted speed difference $\Delta\omega_e$ (or renewal predicted speed difference), and the driving current, and the predicted steering angle may be calculated by integrating the predicted steering angular velocity $\Delta\omega_{sw\_e}$.

Further, if it is determined that the difference value (error value) between the actual speed difference $\Delta\omega_m$ and the predicted speed difference $\Delta\omega_e$ is smaller than the reference error A as the result of the comparison (S18), the predicted steering angular velocity $\Delta\omega_{sw\_e}$ is calculated by the feedback controller 40, and the predicted steering angle is determined as the value obtained by integrating the predicted steering angular velocity $\Delta\omega_{sw\_e}$. The predicted steering angular velocity $\Delta\omega_{sw\_e}$ may be calculated based on the actual speed difference $\Delta\omega_m$, the predicted speed difference $\Delta\omega_e$, and the driving current value of the electric motor.

As described above, according to an exemplary embodiment of the present disclosure, the error between the actual speed difference $\Delta\omega_m$, between the rear left/right wheels and the predicted speed difference (or renewal predicted speed difference) is removed using the correction factor $\Delta\omega_{sw\_e}$ that is determined by the feedback controller 40, and the predicted steering angle value is estimated from the correction factor $\Delta\omega_{sw\_e}$ that is used to determine the renewal predicted speed difference $\Delta\omega_{sw\_e}+\alpha$ when the error is removed. Accordingly, the predicted steering angle value can be reliably estimated as a value that is equal to or similar to the actual steering angle value.

Further, in the present disclosure, since the predicted speed difference is compensated form in the feedback type, it is possible to increase the estimation accuracy of the predicted steering angle value and robustness against disturbance when the predicted steering angle value is estimated.

Figure 3:
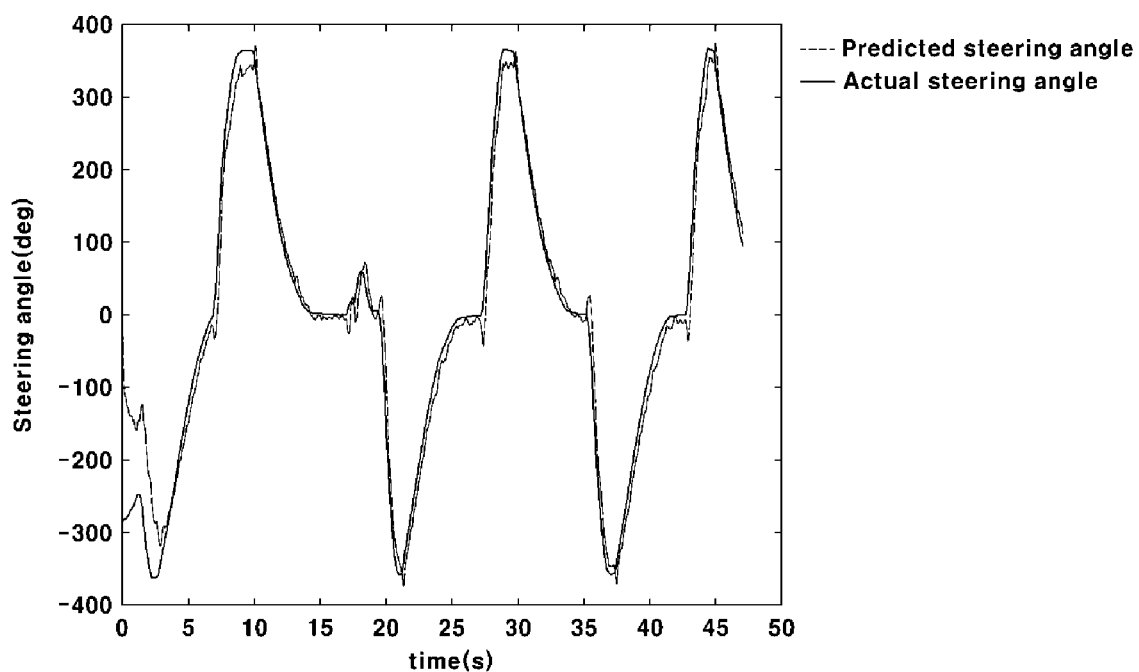
FIG. 3 is a graph illustrating the result of experiments for verifying effects of an apparatus and a method for estimating a steering angle of a vehicle according to an exemplary embodiment of the present disclosure.

FIG. 3 is a graph illustrating the result of experiments for verifying effects of an apparatus and a method for estimating a steering angle of a vehicle according to an exemplary embodiment of the present disclosure. In the graph of FIG. 3, the term "actual steering angle" denotes a steering angle (actual steering angle) measured using a steering angle sensor of a motorized steering device actually installed in a vehicle, and the term "predicted steering angle" denotes a steering angle (predicted steering angle) estimated using the steering angle estimation device.

As seen in FIG. 3, it can be identified that the predicted steering angle value estimated using the apparatus for estimating a steering angle according to an exemplary embodiment of the present disclosure is estimated as a value that is almost similar to the actual steering angle value.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for estimating a steering angle of a vehicle, the apparatus comprising:
a wheel speed difference calculating means configured to determine an actual speed difference by calculating a difference between a rotating speed of a rear right wheel and a rotating speed of a rear left wheel during cornering;
a wheel speed difference estimating means configured to determine a predicted speed difference by estimating the difference between the rotating speed of the rear right wheel and the rotating speed of the rear left wheel based on at least one of a driving current or an assist torque of an electric motor, the electric motor assisting a rotation of a steering wheel during steering;
a feedback controller configured to determine a correction factor for removing an error between the actual speed difference and the predicted speed difference if the error exists;
a predicted speed difference compensating means configured to determine a renewal predicted speed difference by compensating for the predicted speed difference based on the correction factor; and
a steering angle estimating means configured to determine a predicted steering angle by calculating a steering angle of the steering wheel based on the correction factor if it is determined that the error does not exist between the actual speed difference and the renewal predicted speed difference,
wherein the correction factor is a predicted steering angular velocity that is determined based on the actual speed difference, the predicted speed difference, and at least either, or both, of the driving current and the assist torque, and
wherein the steering angle estimating means calculates the predicted steering angle by integrating the predicted steering angular velocity, and
wherein the steering angle estimating means is configured to control the steering angle of the steering wheel in the vehicle based on the predicted steering angle.

2. The apparatus of claim 1, wherein the predicted speed difference compensating means comprises:
a compensated speed difference estimating means configured to determine a compensated speed difference for compensating for the error between the actual speed difference and the predicted speed difference based on the correction factor; and
an error compensating means configured to calculate the renewal predicted speed difference by summing up the predicted speed difference and the compensated speed difference.

3. The apparatus of claim 1, wherein the feedback controller determines that the error exists between the actual speed difference and the predicted speed difference if a difference between the actual speed difference and the predicted speed difference is equal to or larger than a determined reference error.

4. The apparatus of claim 1, wherein the feedback controller determines that the error does not exist between the actual speed difference and the renewal predicted speed difference if a difference between the actual speed difference and the renewal predicted speed difference is smaller than a determined reference error.

5. The apparatus of claim 4, wherein the feedback controller determines that the error exists between the actual speed difference and the renewal predicted speed difference if the difference between the actual speed difference and the renewal predicted speed difference is equal to or larger than the determined reference error.

6. The apparatus of claim 5, wherein the feedback controller re-determines the correction factor for compensating for and removing the error if it is determined that the error exists between the actual speed difference and the renewal predicted speed difference.

7. A method for estimating a steering angle of a vehicle, the method comprising steps of:
determining an actual speed difference by calculating a difference between a rotating speed of a rear right wheel and a rotating speed of a rear left wheel during cornering;
determining a predicted speed difference by estimating the difference between the rotating speed of the rear right wheel and the rotating speed of the rear left wheel based on at least one of a driving current or an assist torque of an electric motor, the electric motor assisting a rotation of a steering wheel during steering;
determining a correction factor for removing an error between the actual speed difference and the predicted speed difference if the error exists;
determining a renewal predicted speed difference by compensating for the predicted speed difference based on the correction factor; and determining, by steering angle estimating means, a predicted steering angle by calculating a steering angle of the steering wheel based on the correction factor if it is determined that the error does not exist between the actual speed difference and the renewal predicted speed difference, wherein the correction factor is a predicted steering angular velocity that is determined based on at least one of the driving current or the assist torque, the actual speed difference, and the predicted speed difference, wherein the step of determining a predicted steering angle includes calculating the predicted steering angle by integrating the predicted steering angular velocity, and wherein the steering angle estimating means is configured to control the steering angle of the steering wheel in the vehicle based on the predicted steering angle.

8. The method of claim 7, wherein the step of determining a renewal predicted speed difference includes:

determining a compensated speed difference for compensating for the error between the actual speed difference and the predicted speed difference based on the correction factor; and calculating the renewal predicted speed difference by summing up the predicted speed difference and the compensated speed difference.

9. The method of claim 7, wherein the step of determining a correction factor includes determining that the error exists between the actual speed difference and the predicted speed difference if a difference between the actual speed difference and the predicted speed difference is equal to or larger than a determined reference error.

10. The method of claim 7, wherein the step of determining a predicted steering angle includes determining that the error does not exist between the actual speed difference and the renewal predicted speed difference if a difference between the actual speed difference and the renewal predicted speed difference is smaller than a determined reference error.

11. The method of claim 10, wherein the step of determining a predicted steering angle further includes determining that the error exists between the actual speed difference and the renewal predicted speed difference if the difference between the actual speed difference and the renewal predicted speed difference is equal to or larger than the determined reference error.

12. The method of claim 11, wherein the step of determining a predicted steering angle further includes re-determining the correction factor for compensating for and removing the error if it is determined that the error exists between the actual speed difference and the renewal predicted speed difference.

* * * * *